(12) United States Patent
Rajendiran et al.

(10) Patent No.: US 11,423,045 B2
(45) Date of Patent: Aug. 23, 2022

(54) AUGMENTED ANALYTICS TECHNIQUES FOR GENERATING DATA VISUALIZATIONS AND ACTIONABLE INSIGHTS

(71) Applicant: Software AG, Darmstadt (DE)

(72) Inventors: Gopinath Rajendiran, Tiruvannamalai (IN); Aaradhana Sridharan, Chennai (IN); Vidhyadharan Deivamani, Theni (IN); Vijay Anand Chidambaram, Chennai (IN); Ulrich Kalex, Potsdam (DE)

(73) Assignee: SOFTWARE AG, Darmstadt (DE)

( * ) Notice: Subject to any disclaimer, the term of this patent is extended or adjusted under 35 U.S.C. 154(b) by 235 days.

(21) Appl. No.: 16/401,202

(22) Filed: May 2, 2019

(65) Prior Publication Data

US 2020/0349170 A1 Nov. 5, 2020

(51) Int. Cl.
  *G06F 16/26* (2019.01)
  *G06T 11/20* (2006.01)
  *G06F 16/248* (2019.01)
  *G06F 3/0484* (2022.01)

(52) U.S. Cl.
  CPC ............ *G06F 16/26* (2019.01); *G06F 3/0484* (2013.01); *G06F 16/248* (2019.01); *G06T 11/206* (2013.01)

(58) Field of Classification Search
  None
  See application file for complete search history.

(56) References Cited

U.S. PATENT DOCUMENTS

| 7,487,139 | B2 * | 2/2009 | Fraleigh | G06F 40/177 |
| 8,577,911 | B1 * | 11/2013 | Stepinski | G06F 16/3328 |
| | | | | 707/765 |
| 2009/0055335 | A1 * | 2/2009 | Smith | G06N 5/04 |
| | | | | 706/19 |
| 2011/0109632 | A1 * | 5/2011 | Gorev | G06T 11/206 |
| | | | | 345/440 |

(Continued)

OTHER PUBLICATIONS

SalesForce Einstein—Overview, retrieved Apr. 30, 2019, 3 pages. https://www.salesforce.com/in/products/einstein/overview/.

(Continued)

*Primary Examiner* — Christopher J Fibbi

(74) *Attorney, Agent, or Firm* — Nixon & Vanderhye P.C.

(57) ABSTRACT

A data analysis system is provided. Processing resources are configured to at least: identify features within a dataset, identify potential features of interest therefrom, and enable selection of one of the identified potential features of interest. Responsive to an identified potential feature of interest being selected: (a) algorithms are run on the dataset to identify at least one related feature that the selected feature of interest is most likely and/or most heavily influenced by; (b) a display is generated to include a visual representation of each related feature, each including associated data value (Continued)

representations; and (c) a visual representation can be selected. A data value representation is selectable together with the selected visual representation. Responsive selection of the visual representation, (a)-(c) are repeated. Responsive to a data value representation being selected in (c), the dataset is filtered based on it, and the repetition is performed with the filtered dataset.

27 Claims, 14 Drawing Sheets

(56) References Cited

U.S. PATENT DOCUMENTS

| | | | | |
|---|---|---|---|---|
| 2015/0019537 | A1* | 1/2015 | Neels | G06F 16/26 707/722 |
| 2015/0113451 | A1* | 4/2015 | Kopp | G06Q 10/10 715/764 |
| 2016/0210355 | A1* | 7/2016 | Krantz, III | G06F 16/34 |
| 2018/0004363 | A1* | 1/2018 | Tompkins | G06F 16/252 |
| 2020/0349140 | A1* | 11/2020 | Wolge | G06F 3/04842 |

OTHER PUBLICATIONS

SalesForce Einstein—Feature, retrieved Apr. 30, 2019, 1 page. https://www.salesforce.com/in/products/einstein/features/.
IBM Watson Analytics, retrieved Apr. 30, 2019, 4 pages. https://www.ibm.com/watson-analytics.
IBM Watson Analytics—Data Preparation, retrieved Apr. 30, 2019, 4 pages. https://www.ibm.com/analytics/cognos-analytics.
IBM Watson Analytics—Smart Data Discovery, retrieved Apr. 30, 2019, 4 pages. https://www.ibm.com/analytics/cognos-analytics.
IBM Watson Analytics—Automated Data Visualization, retrieved Apr. 30, 2019, 4 pages. https://www.ibm.com/analytics/cognos-analytics.
IBM Watson Analytics—Collaboration, retrieved Apr. 30, 2019, 4 pages. https://www.ibm.com/analytics/cognos-analytics.
IBM Watson Analytics—AI Assistant, retrieved Apr. 30, 2019, 4 pages. https://www.ibm.com/analytics/cognos-analytics.
Software AG—Alfabet, retrieved Apr. 30, 2019, 8 pages. http://alfabet.softwareag.com/.
Scikit Learn, retrieved Apr. 30, 2019, 3 pages. https://scikit-learn.org/stable/.
Scikit Learn—Feature Selection, retrieved Apr. 30, 2019, 8 pages. https://scikit-learn.org/stable/modules/generated/sklearn.feature_selection.RFECV.html.

* cited by examiner

```
def perform_RFECV(estimator, X, y):
    from sklearn.feature_selection import RFECV
    rfe = RFECV(estimator = estimator, step=1, cv=3, scoring = 'accuracy')
    rfe = rfe.fit(X, y)
    return rfe
```

Fig. 2A

```
def run_decision_tree(X, y):
    print('-------------DECISION TREE ALGORITHM RUNNING-------------')
    estimator_dt = DecisionTreeClassifier(criterion='entropy', random_state = 0)
    global rfe_dt
    rfe_dt = feature_selection.perform_RFECV(estimator_dt, X, y)
    print('-------------DECISION TREE FINISHED WITH SCORE = ------------', rfe_dt.score(X,y))
```

Fig. 2B

```
def run_random_forest(X, y, num_trees):
    print('~~~~~~~~~~~~~~~RANDOM FOREST(', num_trees,' trees) RUNNING~~~~~~~~~~~~~~~')
    estimator_rf = RandomForestClassifier(n_estimators = num_trees, criterion='entropy', random_state = 0)
    global rfe_rf
    rfe_rf = feature_selection.perform_RFECV(estimator_rf, X, y)
    print('~~~~~~~~~~~~~~~RANDOM FOREST(', num_trees,' trees) FINISHED WITH SCORE = ~~~~~~~~~~~~~~~',rfe_rf.score(X,y) )
```

Fig. 2C

```
def run_extra_trees_classifier(X, y):
    print('~~~~~~~~~~~~~~~EXTRA TREES CLASSIFIER RUNNING~~~~~~~~~~~~~~~')
    estimator_et = ExtraTreesClassifier(n_estimators = 10, random_state = 0)
    global rfe_et
    rfe_et = feature_selection.perform_RFECV(estimator_et, X, y)
    print('~~~~~~~~~~~~~~~EXTRA TREES CLASSIFIER FINISHED WITH SCORE = ~~~~~~~~~~~~~~~', rfe_et.score(X,y))
```

| ID | Name | Functional Distinction/User Satisfaction |
|---|---|---|
| 1 APP-2824 | CAPRICE | Low |
| 2 APP-2903 | EURO-Clearing | Low |
| 3 APP-2955 | Hotspot | Low |
| 4 APP-2984 | KSS-CC | Low |
| 5 APP-2988 | KSS-ZAK | Low |
| 6 APP-3046 | PARADOX | Low |
| 7 APP-3081 | Pension | Low |
| 8 APP-3154 | SWIFT | Low |
| 9 APP-3189 | WAVE | Low |
| 10 APP-3208 | Xetra | Low |
| 11 APP-3209 | ZAS | Low |
| 12 APP-3214 | Batch Balancing Evaluation | Low |
| 13 APP-3242 | Position | Low |
| 14 APP-3243 | TraderNet | Low |
| 15 APP-3244 | Rep | Low |
| 16 APP-3397 | Alfabet @ Cloud | Low |

Fig. 10

AUGMENTED ANALYTICS TECHNIQUES FOR GENERATING DATA VISUALIZATIONS AND ACTIONABLE INSIGHTS

TECHNICAL FIELD

Certain example embodiments described herein relate to data analytics and visualization techniques. More particularly, certain example embodiments described herein relate to augmented analytics systems and methods for generating computer-based data visualizations and insights that are actionable, e.g., automatically in connection with a computing environment.

BACKGROUND AND SUMMARY

Business Intelligence (BI) refers to the concept of analyzing data from different sources and providing key performance indicators (KPIs), dashboards, reporting, and the like. This information is usable in connection with a wide variety of objectives including, for example, achieving targets, reducing manual/human effort of some tasks, and measuring tangible growth of an organization or portions within an organization. BI in this respect can be used to help identify machines correlated with high defect rates in products, predict effects of information technology (IT) systems upgrades, reveal where factory slowdowns occur, improve shipping and logistics operations, etc. The "B" in "BI" thus may be thought of as pertaining broadly to an organization's mission, regardless of what the intelligence is and/or how it is used. In other words, BI has applicability to a wide variety of industries, organizations, objectives, etc.

According to Gartner, there are three waves of BI. The first wave, Traditional BI, is IT-driven and includes predefined visualizations, but provides no insights as to what the data is, what it may mean, how it may be used, etc. The second wave, Self-Service BI, is business-driven and includes customizable visualizations and enables predefined insights to be examined. The third wave, Augmented BI, is machine-driven with visualizations and insights being generated automatically, e.g., with no human intervention. Gartner explains that we presently are in the third wave, and predicts that we will be here for years.

Augmented BI has many benefits. For example, it can bestow the power of data science to "citizen data scientists." A citizen data scientist in this sense is a person in a role tasked with analyzing data, and creating data and business models for an organization, e.g., with the help of Big Data tools and technologies. Augmented BI also can be helpful in finding data patterns and outliers that can easily be missed by human analysts working alone, or working with rudimentary computing and analysis tools. Analysis of data can, for example, be performed using machine learning techniques, and actionable insights can be generated using natural language generation (NLG) and/or other Artificial Intelligence related (AI) techniques. As is known, NLG technology focuses on generation of natural language or human-readable text from data using AI.

It will be appreciated that it would be desirable to further expand upon these and/or other third-wave BI techniques. For example, it will be appreciated that it would be desirable to further empower citizen data scientists, e.g., so that Big Data tools and technologies can be used in uncovering data patterns and outliers in connection with machine learning and AI techniques to automatically generate actionable insights. Certain example embodiments proceed in this manner.

One aspect of certain example embodiments relates to computer-based components that facilitate variance analysis and feature selection factor analysis in connection with a unique workflow for BI exploration, and that in combination help generate actionable insights.

Another aspect of certain example embodiments relates to improved techniques for feature selection and pruning. Certain example embodiments implement a unique workflow for selection and/or identification of significant features that maximally influence one or more target features. For instance, a target feature may be defined based on a user selection. The influencing features are selected by running various machine learning algorithms and choosing the output of the best performing algorithm. This feature selection approach is performed at every level of user analysis/with each user selection, and all algorithms are run at each level. This process is performed automatically and advantageously does not require manual analysis, domain knowledge or expertise of specialized data scientists, etc.

Advantageously, the techniques described herein work with large datasets including, for example, datasets that have hundreds, thousands, or even more features, where it otherwise would not be possible or feasible for a user without data science knowledge to analyze the data. Thus, with the aid of certain example embodiments, users with no knowledge of domain or machine learning and can use the augmented AI engine techniques disclosed herein to obtain actionable insights within minutes.

Certain example embodiments include variance analysis and feature selection factor analysis. Variance analysis in certain example embodiments may be performed by, for example, inputting into a variance analysis component all the feature columns in the dataset, having the variance analysis component use a variance formula to output all the features with a variance score (normalized or otherwise) of the factor analysis component algorithms, and outputting for display to a user the feature(s) that has/have sufficiently high variances (e.g., sorted by variance from high-to-low). Feature selection factor analysis in certain example embodiments may be performed by, for example, (a) having the user select one feature for performing factor analysis, (b) using various machine learning algorithms to find the correlation of the selected feature to all features in the dataset where different algorithms to be run are automatically selected based on the data type involved (e.g., strings, numbers, etc.), (c) outputting all of the features (except the selected one) together with corresponding output scores from the factor analysis component algorithms, (d) sorting the top n features that influence the input feature selected based on accuracy score, mean square error, or other relevancy-related score, (e) displaying to the user the sorted features with features having sores lower than a threshold value excluded, (0 reducing the dataset based on a user selected feature value for the next round of factor analysis, and (g) repeating steps (a) through (0 based on the user selected feature to enable further analysis such that all of the features that previously discarded as not being correlated are taken back to consideration for the repeated feature selection factor analysis. When the scores of a majority of factor analysis features become less than the threshold value, the user may be automatically prompted to stop the navigation, and the user instead may select the final feature to display a list of data entries relevant to the selections made.

In certain example embodiments, a data analysis system is provided. The system includes an electronic interface over which a dataset is accessible and processing resources including at least one processor and a memory coupled thereto. The processing resources are configured to execute instructions stored to the memory to at least: access the dataset using the electronic interface; identify features within the dataset (e.g., where different features describe different properties of or pertaining to one or more data elements in the dataset); and identify potential features of interest from the identified features; enable selection of one of the identified potential features of interest. Additionally, responsive to a selection of one of the identified potential features of interest: (a) each of a plurality of algorithms is run on the dataset to identify at least one related feature that the selected feature of interest is most likely and/or most heavily influenced by; (b) a display including a visual representation of each related feature is generated, with each visual representation including representations of data values associated with the respective related feature; (c) selection of one of the visual representations is enabled, wherein one of the representations of the data values associated with the selected visual representation is selectable together with the selected visual representation; and (d) responsive to one of the visual representations being selected, (a)-(c) are repeated, wherein responsive to a representation of a data value being selected in (c), the dataset is filtered based on the selected representation of the data value and the repetition is performed in connection with the filtered dataset.

According to certain example embodiments, the identification of the potential features of interest from the identified features may include, for each of the identified features, calculating the respective identified feature's variance. For instance, the variances may be normalized and a (potentially user-configurable) predetermined number of the identified features having the highest normalized variances may be designated as the potential features of interest.

According to certain example embodiments, the generation of the display including the visual representation(s) of the related feature(s) may include: determining a chart type for each related feature; and forming each visual representation in accordance with the determined chart type for the respective related feature, e.g., where the chart type for each related feature is determined automatically but is optionally changeable in response to user input.

According to certain example embodiments, the algorithms may be run so as to identify, as a related feature, each related feature for which a corresponding visual representation was selected in a previous repetition.

According to certain example embodiments, the display may be generated to include a visual representation for each related feature for which a corresponding visual representation was selected in a previous repetition.

According to certain example embodiments, the algorithms may be run on a common set of the identified features across each repetition (e.g., all non-pruned features except for a selected dependent feature), regardless of whether any identified features have been identified as related features.

According to certain example embodiments, dataset filtration may be maintained through each subsequent repetition (e.g., based on successive user selections of data values).

According to certain example embodiments, a determination may be made as to which one of a plurality of classes of algorithms is to be run, e.g., with the determination being based on a data type of the selected feature of interest.

According to certain example embodiments, the identification of the at least one related feature that the selected feature of interest is most likely and/or most heavily influenced by may include: determining a predictive value or other relevance-related score of each algorithm run; and identifying, from the algorithm determined to have the highest predictive value or relevance-related score, the feature(s) that most likely and/or most heavily influence the selected feature of interest, as the related feature(s).

According to certain example embodiments, and some implementations, a plurality of related features may or will be identified.

According to certain example embodiments, in response to the number of features returned in (a) falling below a threshold, (i) a user prompt may be generated, and/or (ii) (b) may be performed bit (c) and (d) may be prevented. For instance, (i) and/or (ii) may be performed in response to a majority of the features returned in (a) having a relevance-related score less than a predetermined value.

In addition to the features of the previous paragraphs, counterpart methods, non-transitory computer readable storage media tangibly storing instructions for performing such methods, executable computer programs, and the like, are contemplated herein, as well.

These features, aspects, advantages, and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which:

FIG. 2A is an example code snippet that may be used in connection with recursive feature elimination with cross-validation (RFECV), in connection with certain example embodiments;

FIG. 2B is an example code snippet for a decision tree algorithm that may be used in connection with certain example embodiments;

FIG. 2C is an example code snippet for a random forest algorithm that may be used in connection with certain example embodiments;

FIG. 2D is an example code snippet for an extra trees algorithm that may be used in connection with certain example embodiments;

FIG. 4 is an example screenshot showing the Alfabet Assistant facilitating data layout changes, in accordance with certain example embodiments;

FIG. 10 is an object list generated and displayed for the FIG. 9 sample selections, in accordance with certain example embodiments;

DETAILED DESCRIPTION

Certain example embodiments described herein relate to augmented analytics systems and methods for generating computer-based data visualizations and insights that are actionable, e.g., automatically in connection with a computing environment. In conventional and self-service business intelligence (BI) scenarios, the data sources are analyzed by specialized data scientists. These data scientists employ their domain expertise, their intuitions, and available tools to analyze the data. Their analysis involves more effort, could be biased (intentionally or unintentionally), and oftentimes will have a low accuracy. Certain example embodiments address these and/or other issues by bringing to bear machine learning (ML) and artificial intelligence (AI) technologies for automating the analysis workflow. In this regard, certain example embodiments implement machine-driven approaches for uploading or pushing data, analyzing it, identifying patterns, and generating actionable insights. In certain example embodiments, each phase of the workflow has flexibility through configuration and tuning parameters. Advantageously, certain example embodiments therefore are more machine driven, with very less human intervention being required; highly-accurate; and less susceptible to human-originated bias in the analysis.

Details concerning an example implementation are provided below. It will be appreciated that this example implementation is provided to help demonstrate concepts of certain example embodiments, and aspects thereof are non-limiting in nature unless specifically claimed. For example, descriptions concerning example functions, code, component configurations, analysis phases, machine learning algorithms, regression algorithms, etc., are non-limiting in nature unless specifically claimed.

Figure 1:
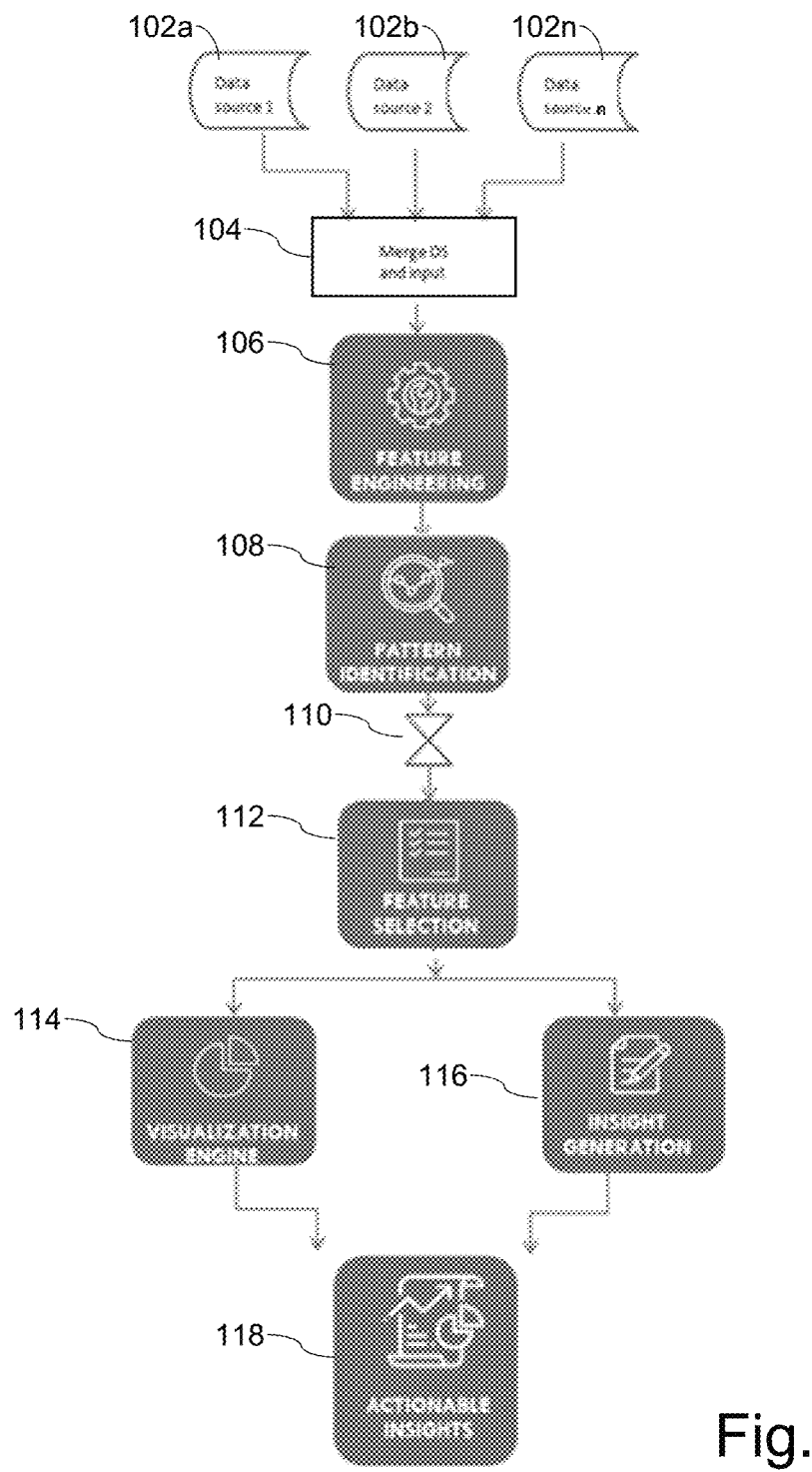
FIG. 1 a diagram providing an overview of how certain example embodiments operate.

FIG. 1 is a diagram providing an overview of how certain example embodiments operate. As shown in FIG. 1, data from various data sources 102a-102n can be ingested into the analysis platform. This may include, for example, uploading data into the platform, scheduling automated data pushes or pulls, accessions from a remote data store (e.g., via a suitable application programming interface (API) or other call), etc. The data from the data sources may be in different formats (e.g., CSV, HTML, XML, JSON, XLS, and/or the like) and thus may be converted to a common format and/or potentially merged, resulting in merged data 104. The platform executes an analysis workflow including phases in connection with the merged data 104 available therein and/or available thereto.

Each attribute in the data includes a name and a set of values. These attributes are referred to as features. The features are engineered in a feature engineering phase 106 to make them more useful for analysis.

The platform proceeds to a pattern identification phase 108. This is performed in certain example embodiments using statistical measures such as, for example, data variance, median, mode, distribution types, etc. It has been observed that, at least in many BI contexts, features with more variance in the data have a higher probability of being a pattern or an outlier that might be left unnoticed by a human data scientist.

The feature selection phase 112 in certain example embodiments involves pruning of irrelevant features and retaining significant ones. The decision of what to keep and what to discard is made in connection with the running of a set of machine learning algorithms, and an aggregated set of features 110 is generated via the pattern identification phase 108 for use in the feature selection phase 112. These algorithms each provide a relevance rank for the features. The algorithms are then evaluated based on metrics such as, for example, accuracy, mean squared error, etc. Based on the evaluation metrics, the feature selection outcome of the best performing algorithm is considered. In other words, a plurality of computer-based algorithms are run, and the overall predictive value of each algorithm is assessed. The features associated with the algorithm having the highest predictive value are then used in certain example embodiments. With respect to the latter, the features used may correspond to variables in the algorithm determined to be statistically significant (e.g., p-values for a regression model below a threshold such as, for example, 0.05), with a large impact (e.g., variables with large coefficients in a regression model), or both (e.g., variables in a regression model with large coefficients that are determined to be statistically significant because their p-values are below a threshold). The classification algorithm may be used for feature that can be classified and may not be numeric; here, an accuracy score or like can be used for measuring the threshold on which the feature has an influence on other features.

These patterns are then fed into the visualization engine 114 and insight generation engine 116. The visualization engine 114 automatically generates different kinds of visualizations such as, for example, bar charts, pie charts, etc. The decision of the type of chart is made based on the type and/or distribution of data. The insight generation engine 114 consumes information about data patterns and generates a summary in human readable natural language text. The visualization engine 114 and the insight generation engine 116 provide a clearer and more discernable picture of the identified patterns identified in the feature selection phase 112. The output of the workflow is a set of actionable insights 118. Actions to be taken depending on the insights can be configured and may depend at least in part on the use case or problem being addressed by the platform in different example embodiments. The insight generation engine 116 may receive the output of the variance and factor analysis and, with the aid of natural language generation (NLG) techniques, used to provide a text representation of the data.

1. Example Feature Engineering Related Techniques

Feature engineering oftentimes is a manual process of using domain knowledge to transform a feature into multiple features or combine multiple features into a single feature. This can be both expensive and time consuming. Certain example embodiments help automate feature engineering by implementing a "generic approach" to handle specific types of features such as, for example, date, pin code, etc. The generic approach refers to the fact that these features are not specific to any domain and hence can provide useful information irrespective of the domain. For example, dates can be of various formats. First, the format of the date is identified.

Second, the date is parsed into features like day, month, year, etc. These features can be very useful when determining insights pertaining to a day, or a month, or a year. The date information when left "as-is" remains as a string or a number and may be removed as part of feature pruning. These transformed features then become a part of the data and can be used for further analysis.

A similar approach can be followed for other types of features, as well. In this regard, certain example embodiments identify the feature type as being one of a plurality of predefined feature types, identify one or more predefined transformations applicable to the identified feature type, apply each applicable predefined transformation, and store the transformed data and the original data in the system for analysis purposes. Feature types may include, for example, name, date, address, etc. Mappings can include, for example, number-to-string mappings, string-to-number mappings, aggregation of first and last names, disaggregation of first and last names, etc.

2. Example Pattern Identification Techniques

The pattern identification phase of certain example embodiments considers only the features that most significantly influence the target feature. This phase performs aggregation on each of the chosen features with the target feature. The aggregation may form or fit to a predefined distribution type such as, for example, a normal distribution, an exponential distribution, etc. These distributions each have a set of parameters specific for their respective types. Common parameters include, for example, variance, mean, median, mode, standard deviation, etc.

When an aggregation is performed on a feature and the target feature, the values fall under a distribution type and have the above-listed and/or other parameters. A higher variance denotes the effect of difference between the minimum and the maximum value. In many instances, a "normal scenario" is less likely to have features with values that vary significantly. Consider, for example, the case of a monthly bug analysis report, where data is tracked for the total number of bugs filed daily. If the number of bugs on first few days of the month is around 10 and on the last few days of the month is around 100, this likely indicates that there is a huge difference, and the pattern of more bugs observed during the end of the month can be identified.

Mean, median, and mode can be used to determine if the distribution is skewed or not. A skewed distribution can be positive or negative, depending on the scenario. The property of skewedness can serve as a good indicator of a pattern, as well.

The aggregation of features with the target feature are ordered based on their perceived importance. This is decided depending on the variance analysis in certain example embodiments.

3. Example Feature Selection and Pruning Techniques

Feature selection and pruning oftentimes is a manual process of using domain knowledge to remove irrelevant features and retain only significant ones. As above, this can be a time consuming and human-resource intensive process, especially if the number of features is high. Certain example embodiments automate this process by implementing a computer-mediated workflow. The workflow includes, for example:

1. Based on a user selection, the feature chosen by the user is deemed the target/dependent feature. All other features are treated as the input/independent features (or at least candidate input/independent features).
2. Feature scaling (or normalization) is performed on the independent features. Feature scaling can be used to help standardize the range of independent variables or features of data. Feature scaling can also help normalize the output of the variance analysis discussed in greater detail below, enable comparisons on impact to be made more reliably, etc.
3. To perform feature selection, an algorithm called recursive feature elimination with cross-validation (RFECV) can be used. RFECV takes as inputs the machine learning algorithm, and the independent and dependent features. It calculates a relevance ranking/score for each feature, and this ranking is determined based on how much the feature influences/impacts the target feature. FIG. 2A is an example code snippet that may be used in connection with RFECV, in accordance with certain example embodiments.
4. The RFECV is run with a set of machine learning algorithms such as, for example, decision tree, random forest, and extra trees classifier algorithms. Example code snippets for running these algorithms are provided in FIGS. 2B-2D. Additional machine learning or other mathematical algorithms can be plugged in to the framework in addition to, or in place of, some or all of these classifiers, e.g., depending on the type of problem being solved. For instance, regression, classification, and/or other algorithms may be used in certain example embodiments. In certain example embodiments, different classes of algorithms may be stored, with each class including one or more respective algorithms. The class of algorithm to be run may be based on, for example, a data type of a selected feature of interest.
5. The RFECV develops a ranking of features for each of the algorithms. These algorithms are then weighed based on evaluation metrics. Evaluation metrics may include, for example, accuracy scores, mean squared error, etc. The feature selection output of the best performing algorithm is chosen. The features marked by the algorithm as less significant are pruned. The threshold of importance based on which a feature is chosen or removed can be configured. For example, a feature with rank lesser than 10 (configured threshold) may be removed, a dependent variable with a significance less than 95% may be removed, etc.

4. Example Visualization Generation Techniques

The identified patterns are converted into intuitive visualizations using data aggregations. Based on the distribution type and the number of values, the charts are automatically generated. Certain example embodiments are able to generate charts of different types including, for example, bar, pie, doughnut, and/or other charts. Different example embodiments may use other charts in place of, or in connection with, some or all of these examples. For example, whether a pie, bar, or other chart type is to be drawn may be based on, for example, the number of output values that are sent by the pattern identification module. For instance, if the number of values is less than or equal to 3, a pie chart can be drawn; otherwise, a bar chart can be created. In certain example embodiments, the chart type for a given feature is determined automatically but is changeable in response to user input.

5. Example Actionable Insight Generation Techniques

The identified pattern would be from the output of the machine learning techniques. Different stated, the combination of features and its associated numerical values calculated based on data aggregation techniques may be not intelligible other than to a technical team. Thus, natural Language Generation (NLG) technology may be used to present the patterns identified to a citizen data scientist in a more descriptive and understandable way, e.g., as will become clearer from the specific example discussed below.

6. Alfabet Example and Use Case

Details of a specific example and use case will now be provided in connection with Alfabet, which is a software platform provided by the assignee. It will be appreciated that the discussion of Alfabet, the modifications thereto, and the specific use case and analysis approach, are provided for purposes of explanation and without limitation unless specifically claimed.

6.1 Generic Alfabet Assistant

Figure 3:
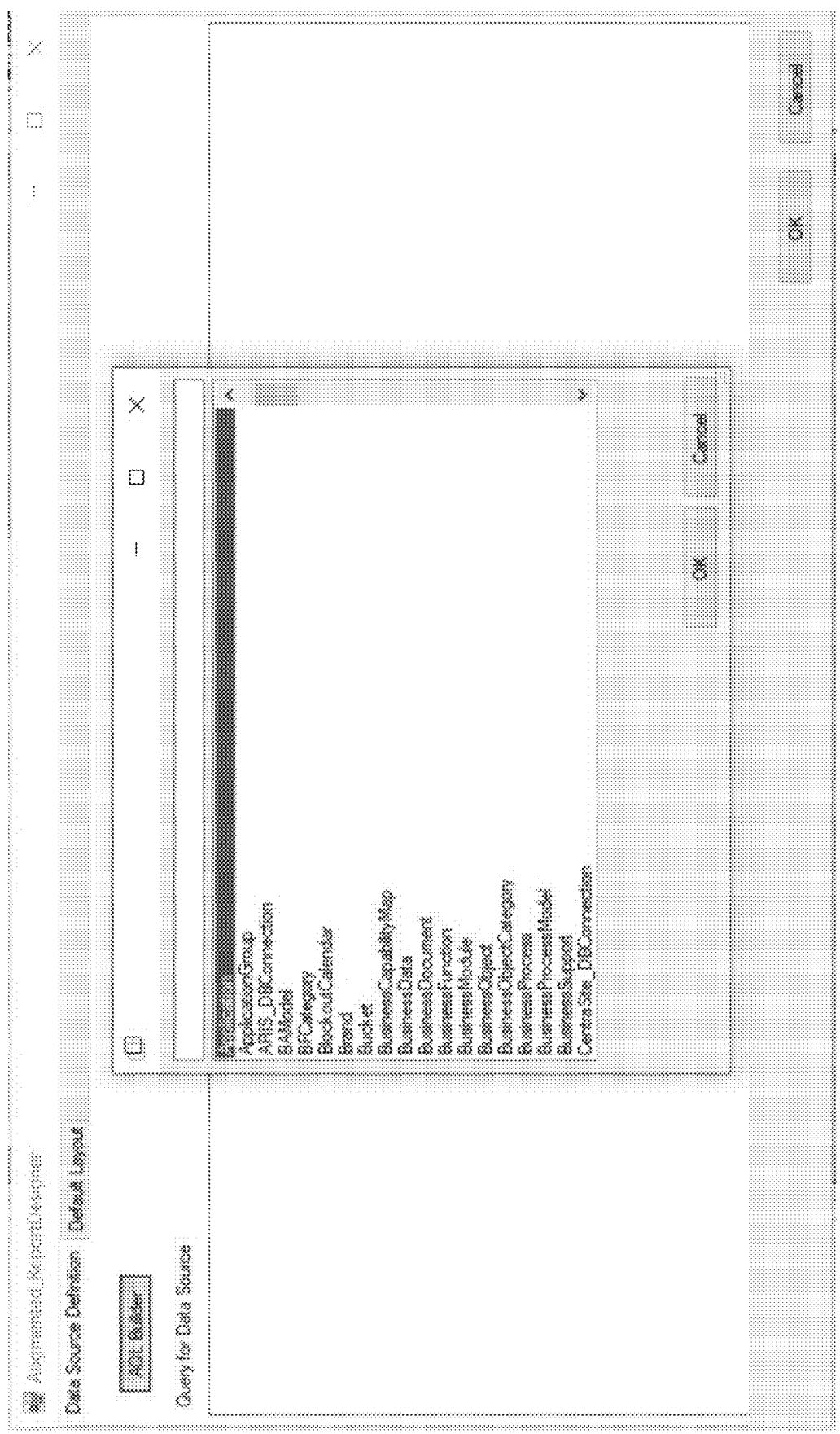
FIG. 3 is an example screenshot showing the Alfabet Assistant facilitating selection of the class(es)/dataset(s) to be used for generating artificial intelligence (AI) reports, in certain example embodiments.

The Alfabet Assistant is a generic solution for selecting the class(es) or data source(s) to be used in generating AI reports. In this regard, FIG. 3 is an example screenshot showing the Alfabet Assistant facilitating selection of the class(es)/dataset(s) to be used for generating AI reports, in certain example embodiments.

After selecting the class(es)/data source(s), the user can select from a list or the like properties or feature columns to be used in the AI reports. Data clean-up and/or other pre-processing settings may be provided here. Clean-up and pre-processing operations may include, for example, filling in missing values in the dataset with default or other user-specified values. Users also can specify feature elimination percentages and row elimination percentages, e.g., to automatically remove features and rows if there are empty values in the dataset that are more than the given threshold percentage. Other data clean-up and pre-processing operations approaches may be implemented here as well, or in the alternative. Clean-up and pre-processing operations may be performed automatically in certain example embodiments, e.g., based on pre-programmed heuristics, once user settings have been made or confirmed, etc.

Figure 4:
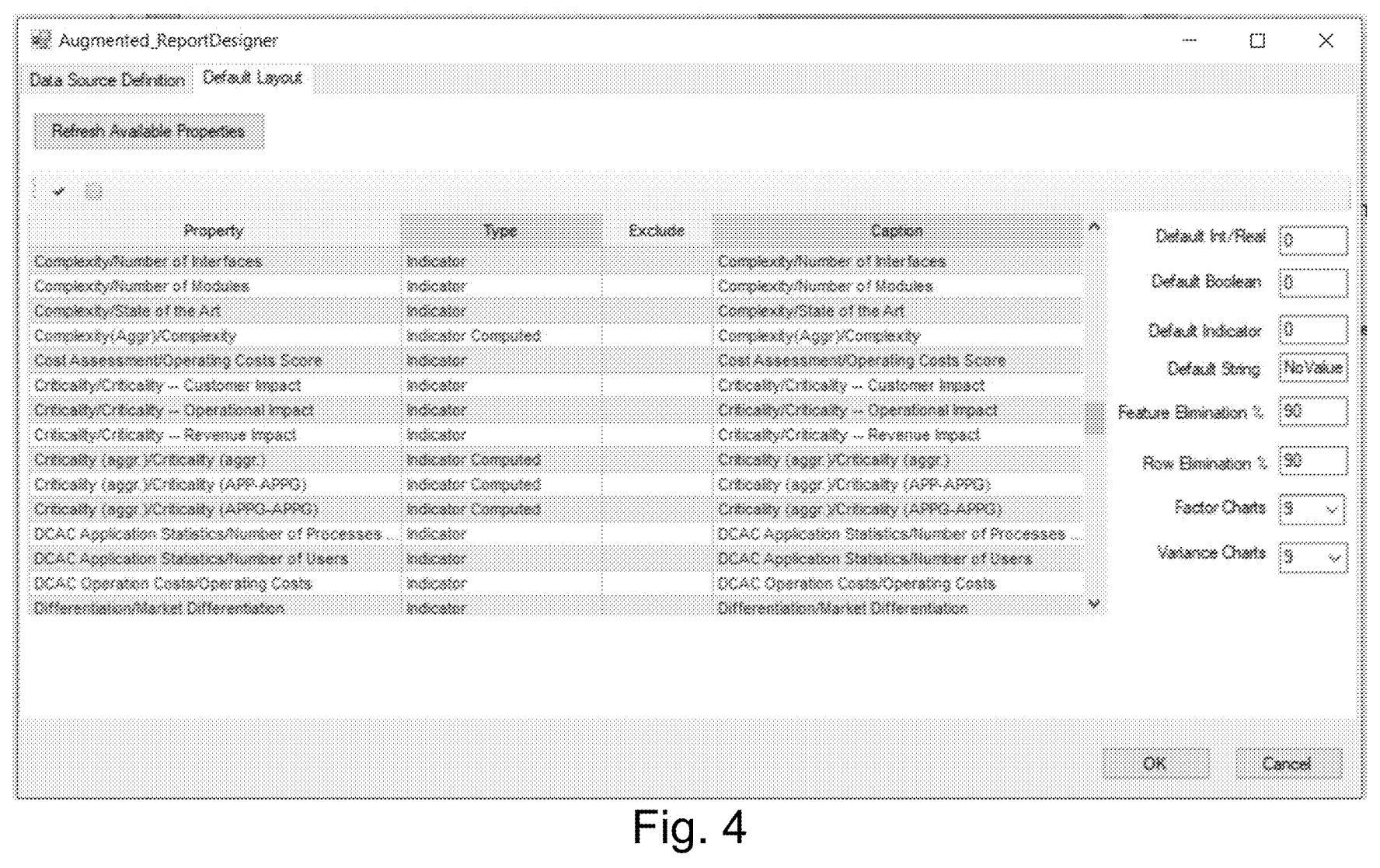

FIG. 4 is an example screenshot showing the Alfabet Assistant facilitating data layout changes, in accordance with certain example embodiments. As can be appreciated from FIG. 4, field types (such as, for example, string, indicators, Boolean, integer, real, etc.) may be specified. The regression or classification algorithms take into account these types while running the AI reports. For instance, regression algorithm types may take into account integer and real type variables; classification algorithm types may take into account string, indicators, and Boolean type variables; etc. In certain example embodiments, transformations may be made, e.g., as initiated by the system and/or as provided by the user. For instance, certain data, although categorical in nature, may be considered highly ordered and thus may be converted into an integer value. For instance, machine age (and other variables) oftentimes is grouped into categories (e.g., machine less than 1 year old, 1-3 years old, 3-5 years old, etc.), and this data can be transformed accordingly and thus can be used in connection with different classification and/or regression algorithm types.

The settings are saved, e.g., in an XML report template that may be used when running the report. A sample XML template is as follows:

```
<AugmentedReportsXMLDef Query="ALFABET_QUERY_500 FIND Application;"
    ClassName="Application" NumberOfViewsVariance="9"
    NumberOfViewsFactor="9" defaultInteger="0" defaultBool="0"
    defaultIndicator="0" defaultString="NoValue"
    featureEliminationPercentage="90" rowEliminationPercentage="90">
    <AugmentedReportsFields>
        <AugmentedReportsFieldDef Name="ID" DisplayFieldType="String"
            IsExcludedInFactorAnalysis="false" />
        <AugmentedReportsFieldDef Name="Cloud Candidacy/Usage
            Variations" FieldType="Indicator"
            IsExcludedInFactorAnalysis="false" />
        <AugmentedReportsFieldDef Name="Complexity/Number of
            Interfaces" FieldType="Indicator"
            IsExcludedInFactorAnalysis="false" />
        <AugmentedReportsFieldDef Name="Criticality/Criticality --
            Operational Impact" FieldType="Indicator"
            IsExcludedInFactorAnalysis="false" />
        <AugmentedReportsFieldDef Name="Criticality/Criticality --
            Revenue Impact" FieldType="Indicator"
            IsExcludedInFactorAnalysis="false" />
        <AugmentedReportsFieldDef Name="Functional
            Distinction/Functional Uniqueness" FieldType="Indicator"
            IsExcludedInFactorAnalysis="false" />
        <AugmentedReportsFieldDef Name="User Satisfaction/User
            Satisfaction" FieldType="Indicator"
            DisplayFieldType="Indicator"
            IsExcludedInFactorAnalysis="false />
    </AugmentedReportsFields>
</AugmentedReportsXMLDef>
```

6.2 Alfabet AI Engine

Figure 12:
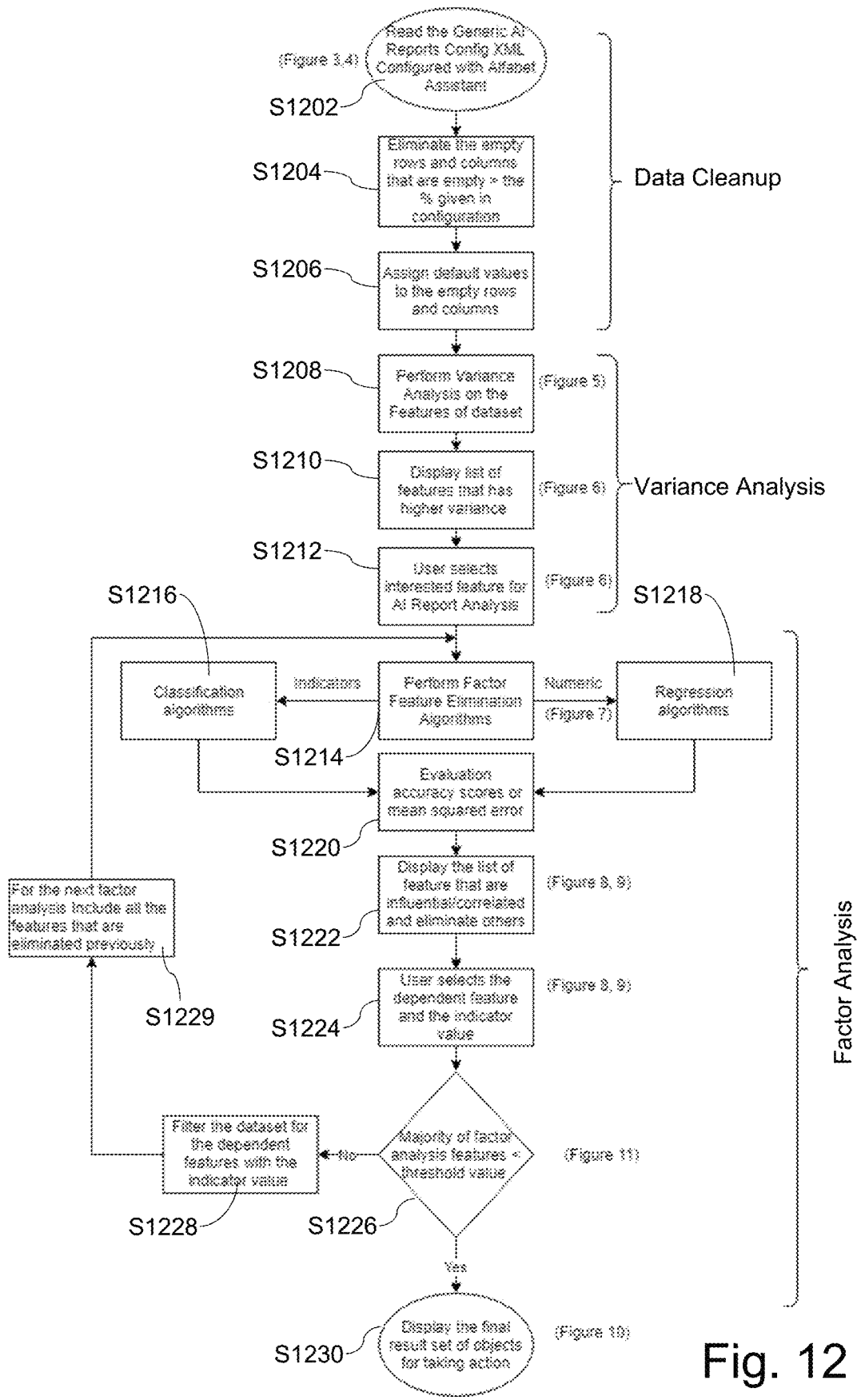
FIG. 12 is a flowchart showing an end-to-end approach for augmented analysis in accordance with certain example embodiments.
Figure 13:
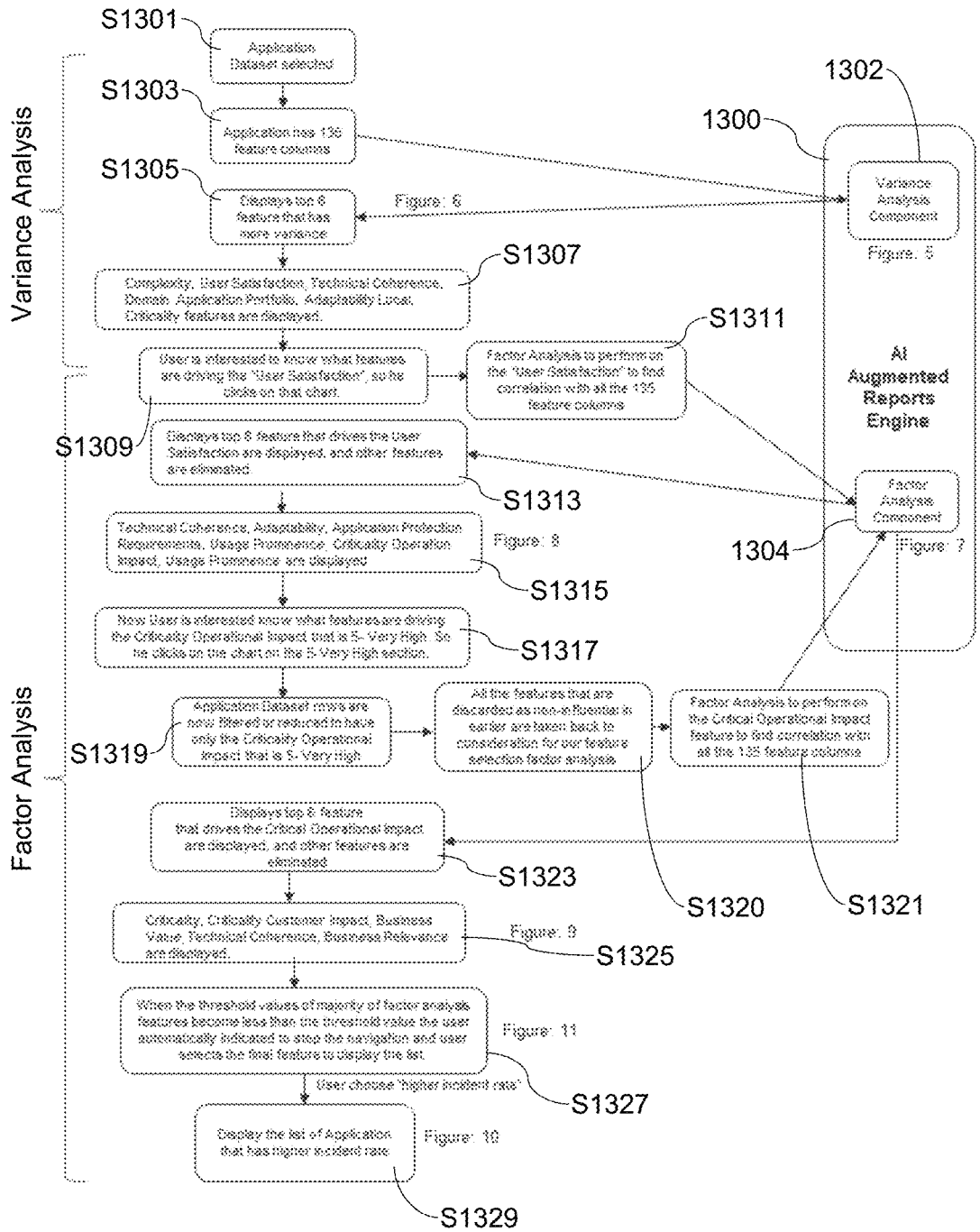
FIG. 13 is an example flowchart showing further details concerning variance analysis and factor analysis that may be used in connection with certain example embodiments.

Details concerning operation of the Alfabet AI engine will now be provided. In this regard, FIG. 12 is a flowchart showing an end-to-end approach for augmented analysis in accordance with certain example embodiments, and FIG. 13 is an example flowchart showing further details concerning variance analysis and factor analysis that may be used in connection with certain example embodiments. As shown in FIG. 13, for example, an AI augmented reported engine 1300 includes a variance analysis component 1302 and a factor analysis component 1304. The AI augmented reported engine 1300 in this sense may be hosted on a computing platform supported by processing resources including at least one hardware processor and a memory coupled thereto. The memory may store instructions (e.g., in a program) that, when executed by the processing resources, perform the programmed functionality. In this regard, the variance analysis component 1302 and the factor analysis component 1304 may be implemented as program modules. The visualizations described below may be generated for output to a suitable display device (e.g., via a GUI or the like). The data may be accessed via an electronic interface (e.g., by making API calls, retrieving data from a store or network location, etc.). The data to be analyzed may be stored to the platform and/or remote from it.

6.2.1 Data Cleanup

The generic AI reports configuration XML file that is created from the Alfabet assistant explained above is read in step S1202. Rows and/or columns that are empty more than the percentage set in the configuration are emptied or removed in step S1204. Default values are assigned to other empty rows and/or columns in step S1206, as indicated above.

6.2.2 Variance Analysis

Figure 5:
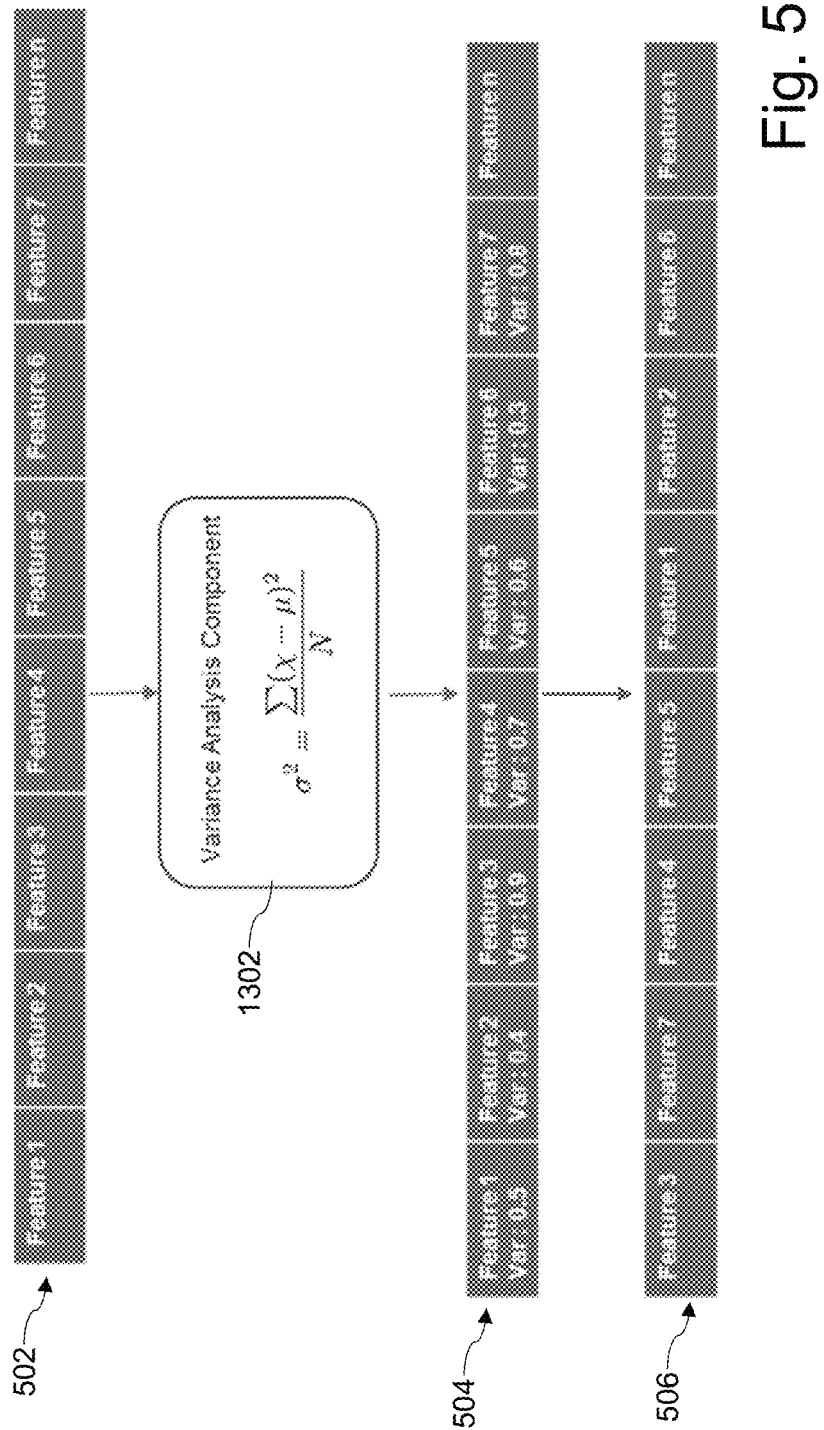
FIG. 5 is a schematic representation of a variance analysis approach that may be used in connection with certain example embodiments.

As will be appreciated from the above, and as can be seen from FIGS. 12-13, variance analysis is the next step in the generation of AI reports (step S1208 in FIG. 12) and is performed in connection with the variance analysis component 1302. As shown in FIG. 13, the application dataset is selected in step S1301. FIG. 5 is a schematic representation of this variance analysis approach, which may be used in connection with certain example embodiments. As can be seen from FIG. 5, the variance analysis component 1302 receives as input feature columns from the dataset 502 and calculates variance scores 504 for the input dataset 502. These scores are sorted to develop an ordered set of features 506, arranged from highest variance to lowest variance. The variance values may be normalized or otherwise processed so that they are more comparable to one another. In certain example embodiments, the input dataset 502 may be normalized so that post-analysis variance need not be normalized.

In greater detail, the variance analysis component 1302 of the AI engine 1300 shown in FIG. 13 reads the XML reports template to understand the class object(s) and issues a query or otherwise retrieves the dataset in step S1301. The example here is determined in step S1303 to involve a Class "Application," which has about 136 feature columns. The variance analysis component 1302 reads the list of properties or features to be used for the variance analysis. Variance analysis is performed to understand how varied the data in every property feature. Variance is calculated as:

$$\sigma^2 = \frac{\sum (\chi - \mu)^2}{N}$$

where $\sigma^2$ is variance, $\chi$ is the value of an individual data point, $\mu$ is the mean of data points, and N is the total number of data points.

The variance analysis component 1302 sorts the features by degree of variance, e.g., such that higher variance features appear before to lower variance features (step S1210 in FIG. 12). In certain example embodiments, the variances may be normalized to aid in comparisons. A predetermined number or percentage of the identified features having the highest normalized variances may be designated as potential features of interest. For example, as noted in step S1305, the top six features may be output. Sorting may be performed prior to or during the outputting of this information. The predetermined number or percentage may be user-configurable in certain example embodiments.

Figure 6:
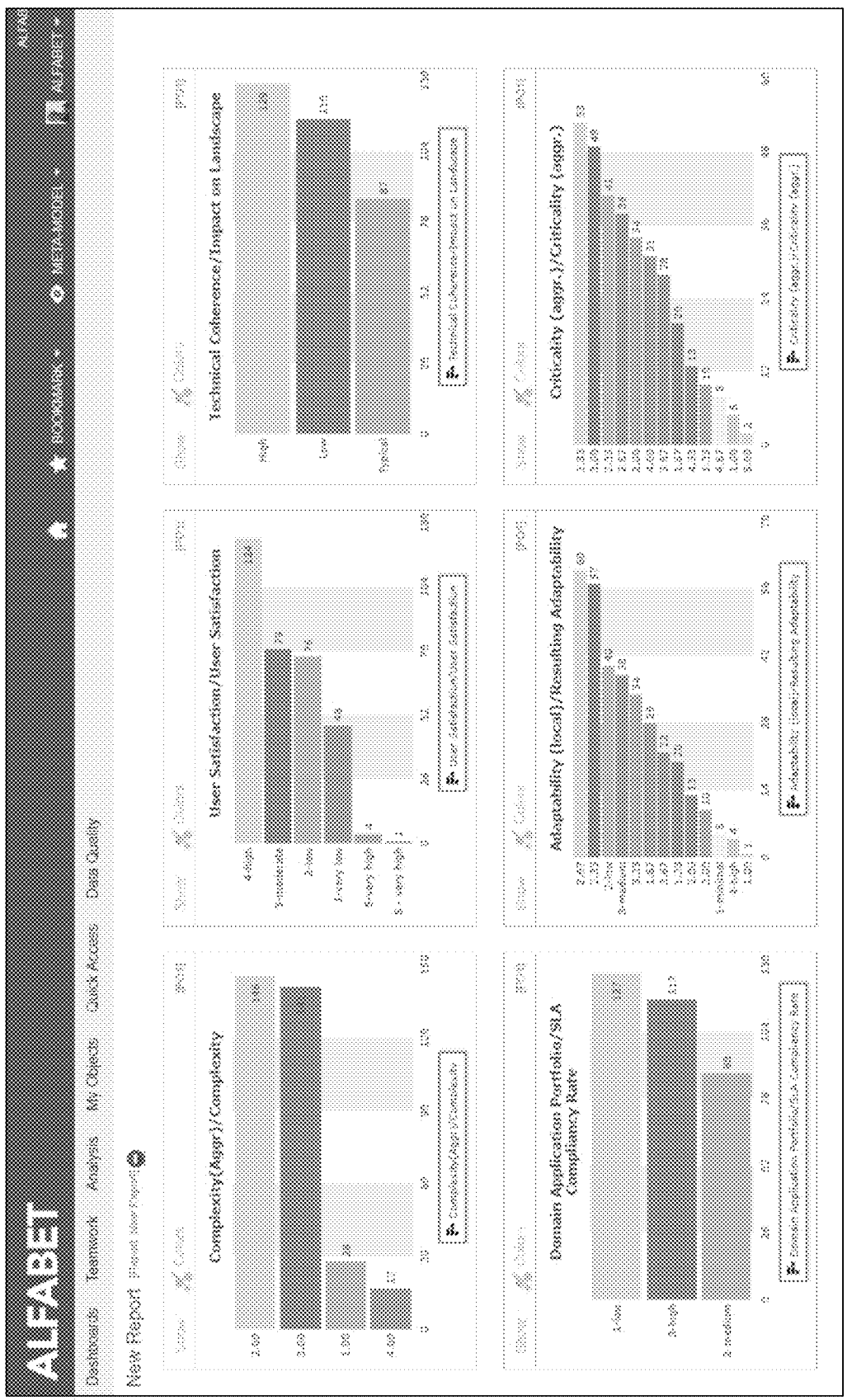
FIG. 6 is an example screenshot outputting variance information for features in a sample dataset, in accordance with certain example embodiments.

FIG. 6 is an example screenshot outputting variance information for features in this sample dataset, in accordance with certain example embodiments. The user can choose how many charts are to be shown on the screen. In the FIG. 6 example, the six feature columns having the highest (normalized or non-normalized) variance are displayed, from among the 136 features of the Class Application. As noted in step S1307, and as can be seen from FIG. 6, information for the complexity, user satisfaction, technical coherence, domain application portfolio, adaptability (local), and criticality features are displayed. In the FIG. 6 example, histogram information is displayed in bar chart form, although it will be appreciated that other visualizations of this and/or other information may be provided. Each graph is a visual representation of a corresponding feature. Representations of data values are included in the visual representation. can be ordered based on count/frequency, or can follow actual or implied order (e.g., scale of 1-5 for user satisfaction, high/medium/low for technical coherence), etc. In the FIG. 6 example, the visual representations of the features are bar charts/histograms, and the representations of the data values are bars in the bar charts/histograms. It is noted that the data values This description applies for FIGS. 8-9, as well.

The user can select a feature of interest as noted in step S1212 of FIG. 12, e.g., by clicking on one of the graphs in FIG. 6. This will cause AI reports to be generated for the selected feature, assuming that that feature is the dependent variable. As indicated in step S1309 of FIG. 13, in this example, the user is interested to know what factors are driving user satisfaction, so that graph is selected.

6.2.3 Feature Selection Factor Analysis

Figure 7:
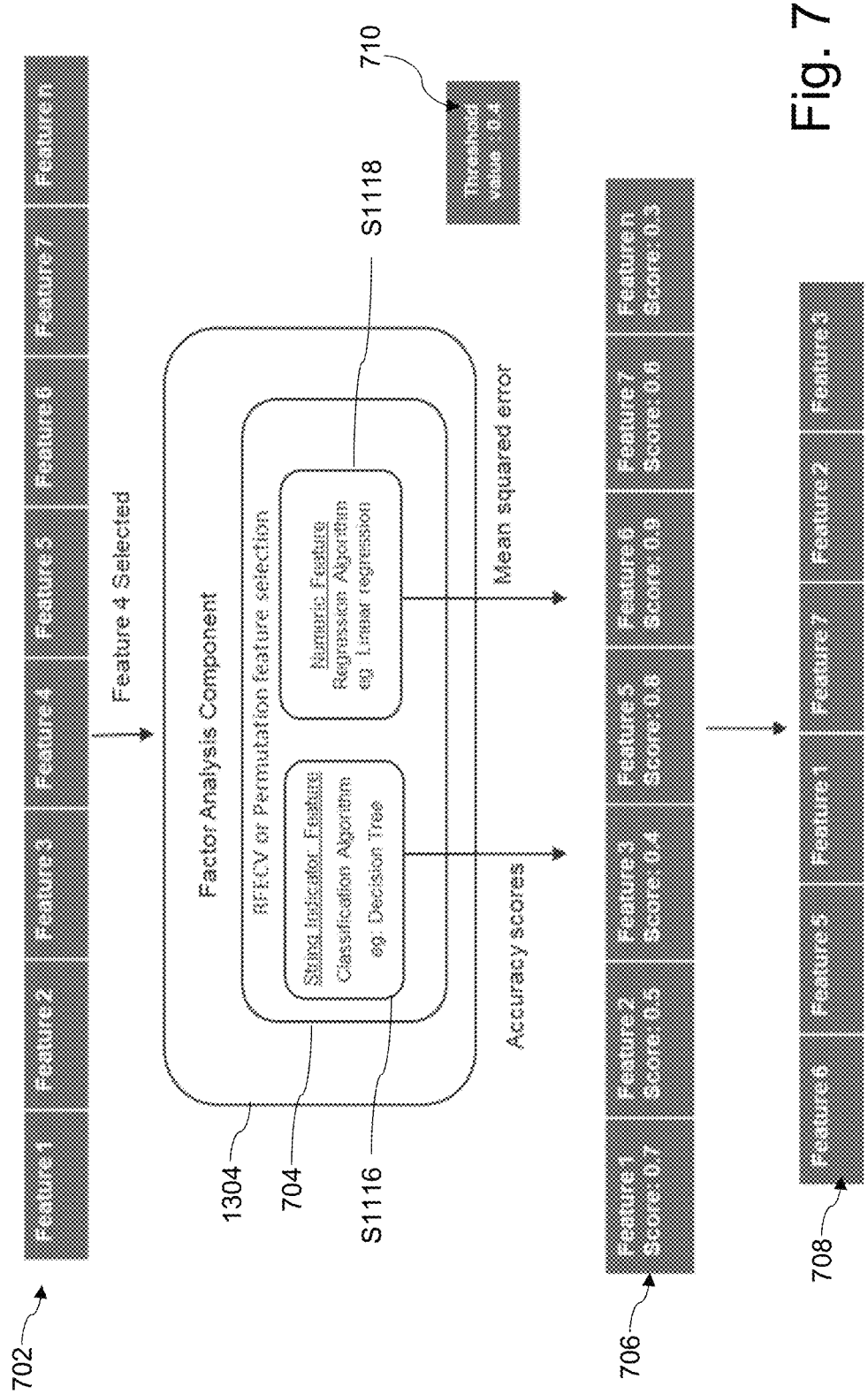
FIG. 7 schematically shows how feature analysis may be performed in connection with certain example embodiments.

Once the user selection is done on a feature, the factor analysis component 1304 runs to determine other features that are influential/dependent on the selected feature. As shown in step S1311, factor analysis is performed on all 135 of the other feature columns so as to find features that are correlated with the user selected feature. FIG. 7 schematically shows how feature analysis may be performed in connection with certain example embodiments. As shown in FIG. 7, one of the features in the set of features 702 is selected for factor analysis. In the FIG. 7 example, feature 4 is selected. The factor analysis component 1304 performs RFECV, permutation feature selection, and/or the like, as a part of its engine 704. In other words, feature elimination is run in step S1214, e.g., as a preprocessing step to aid the factor analysis. This may include running feature elimination algorithms such as, for example, RFECV, permutation feature selection algorithms, and/or the like.

The type of algorithm is selected based on the data type of the selected feature data type in certain example embodiments. As shown in FIG. 7, if selected feature 4 is a string or indicator feature, then a classification algorithm such as, for example, a decision tree, random forest, extra trees, or other algorithm is performed (step S1216). If feature 4 is a numeric feature, then a regression algorithm such as, for example, a linear regression algorithm, is performed (step S1218). The former produces accuracy scores, and the latter produces mean squared error in certain example embodiments (step S1220). It will be appreciated that other algorithms will generate other accuracy-indicating outputs. The Python Scikit-learn library may be used in connection with the running of these and/or other algorithms. Scikit-learn is a machine learning software library for the Python programming language. It features various classification, regression, and clustering algorithms including support vector machines, random forests, gradient boosting, k-means, and DBSCAN algorithms, and it is designed to interoperate with the Python numerical and scientific libraries NumPy and SciPy. The algorithms are weighed based on these evaluation metrics, and the feature selection output of the best performing algorithm is chosen. The output 706 from the factor analysis component includes the features with the scores assigned by the top performing algorithm (and the output may include all features except for the one selected feature, as that is the dependent variable). The top n features 708 that influence the input feature are selected based on this output and, as above, sorting may facilitate these output- and/or display-related operations. Additionally, or in the alternative (e.g., as an alternative to outputting the top n features), scores less than a user-configurable and/or machine-set threshold 710 may be eliminated from the output list and/or ordering. Thus, the list of features that are highly influential/dependent on the selected feature are displayed as indicated in step S1222 of FIG. 12.

Figure 8:
FIG. 8 is an example screenshot showing the top factors that are highly influential/dependent on the feature previously selected, in accordance with certain example embodiments.

FIG. 8 is an example screenshot showing the top factors that are highly influential/dependent on the feature previously selected, in accordance with certain example embodiments (see steps S1313 and S1315 in FIG. 13). In this example, technical coherence, adaptability, application protection requirements, usage prominence, criticality on operational impact, and usage prominence are displayed. This indicates that these six factors are highly influential/dependent on user satisfaction. As noted above, the graphs are visual representations for corresponding features, and each visual representation includes a representation of data values for the particular corresponding feature. The visual representations in certain example embodiments can be ordered by likelihood of impact (e.g., p-value in a regression) and/or magnitude of impact (e.g., coefficient in a regression), etc. The number of features returned may be user-defined, all features whose likelihood of impact are greater than a predetermined percentage (potentially up to a user-defined limit), etc. Although multiple features are displayed, it will be appreciated that that might not always be the case.

The user is able to select any of the listed features and/or indicators within any of the features to further drill down to reveal additional information, e.g., to try to determine what features are the highly influential/dependent on the selected feature and/or value (see step S1224 in FIG. 12). In this example, the user is interested in knowing what features are driving the criticality on operational impact and therefore selects the value of "5-very high" in the associated feature in step S1317. The entire Application dataset is now reduced or filtered in step S1319 to have rows with only "Criticality on Operational Impact" with "5-Very High" values. With this dataset, the factor analysis component 1304 again runs the factor analysis component, as indicated in step S1321, which involves a process similar to that described above. In this sense, a data value is selectable together with the feature in which it is located, and filtering is performed based on this joint selection. Of course, in some instances, a feature may be selected independently of a data value. It is noted, however, that all features that previously were discarded as non-influential are taken back into consideration for feature selection factor analysis in step S1321, as they might become influential at this level of analysis (e.g., as noted in step S1320, which precedes step S1321).

Figure 9:
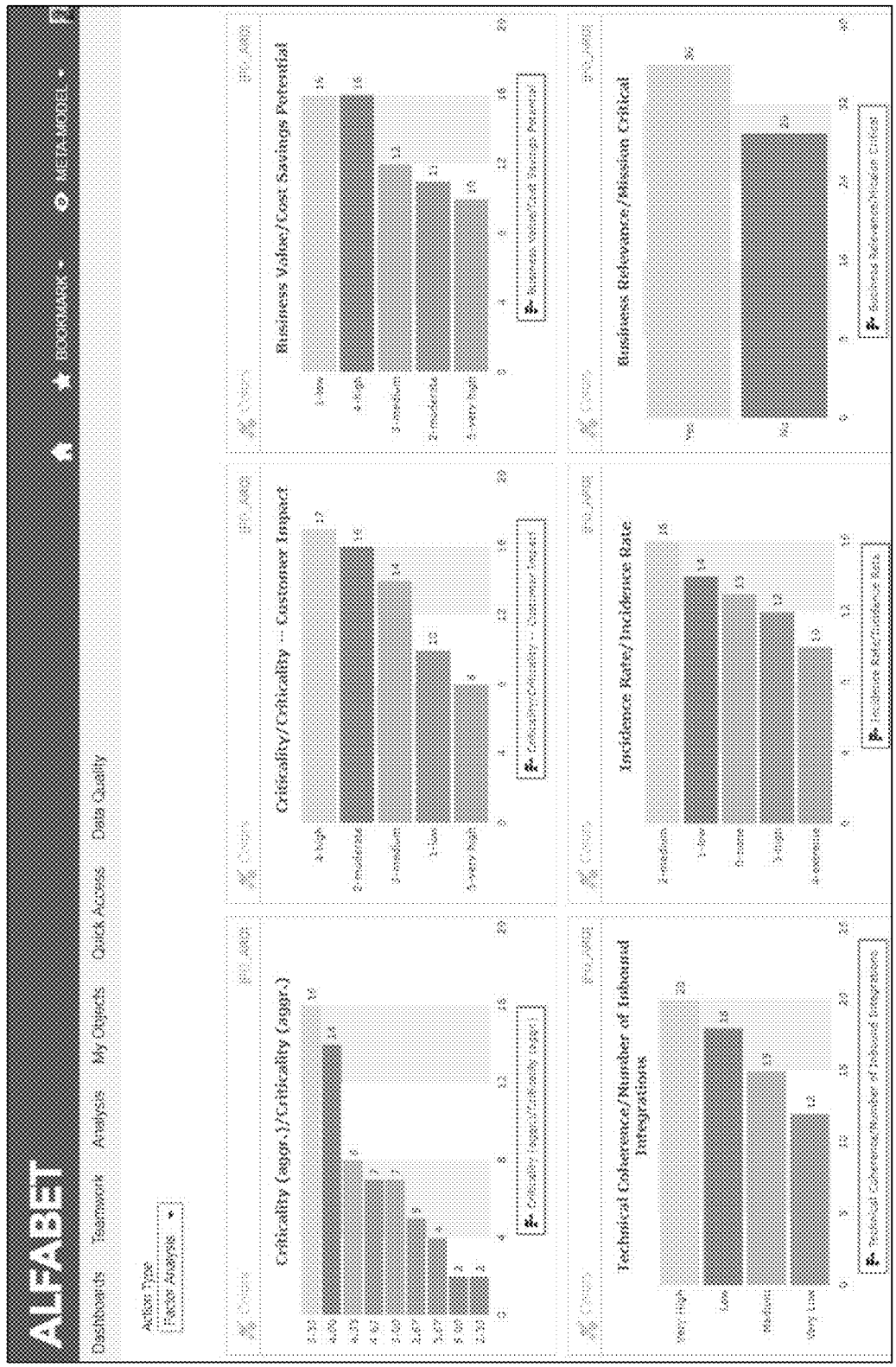
FIG. 9 is an example screenshot showing the top factors that are highly influential/dependent on the feature and value of the feature previously selected from FIG. 9, in accordance with certain example embodiments.

The FIG. 9 example screenshot thus is generated in this example, as indicated in step S1323. As can be seen from FIG. 9, and as noted in step S1325 in FIG. 13, criticality in the aggregate, criticality on customer impact, business value, technical coherence, incidence rate, and business relevance are the identified features.

The user can now come to know that the incident rate has a key impact in user satisfaction, and the user can choose to drill down further by clicking on any of the features in FIG. 9 to perform the feature selection factor analysis as discussed above. And as noted above, for example, each time the user chooses to drill down further, all the features that are discarded as non-influential in earlier levels of analysis are taken back into consideration for the feature selection factor analysis, as there could be a relation between the newly selected feature and the old discarded one. In other words, in certain example embodiments, the algorithms are run on a common set of the features from the dataset with each drill-down, regardless of whether any those features has/have been identified as being relevant to a prior level of analysis. This helps ensure feature selection factor analysis provides accurate results at every level of analysis.

In certain example embodiments, the algorithms may be programmed to assume the relevance of a feature selected in a previous level of analysis. In other words, the algorithms may be run so as to identify, as a relevant feature, each feature for which a corresponding visual representation was selected in a previous repetition. Similarly, in certain example embodiments, filters may be "stacked" or maintained as between subsequent drill-downs.

On the other hand, if user wants to stop at any point to look at the list of Applications that fall under this category, the user can click on the object list indicator to display the relevant information. FIG. 10 is an object list generated and displayed for this sample user selections, in accordance with certain example embodiments.

Figure 11:
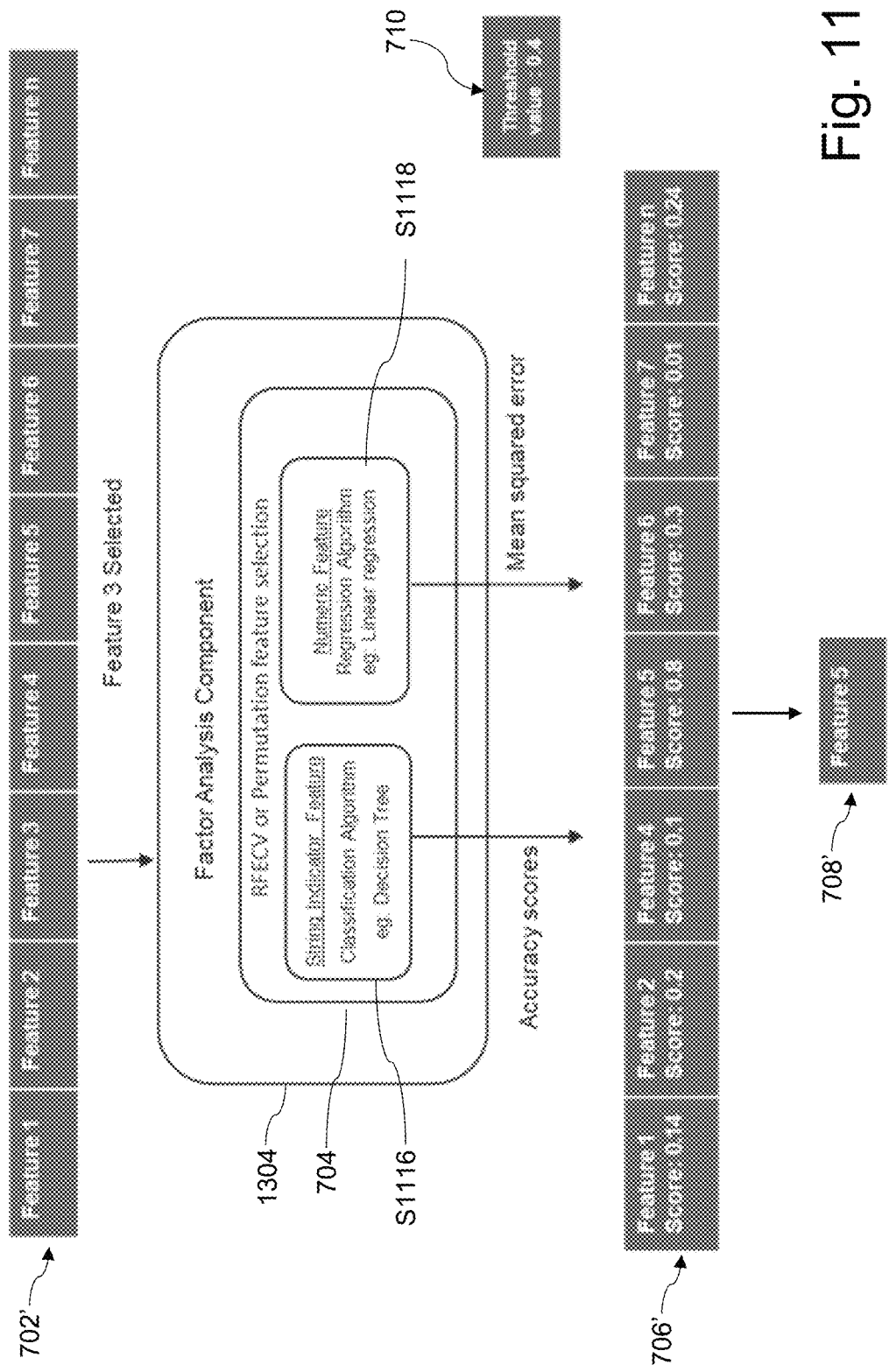
FIG. 11 is similar to FIG. 7 and schematically shows how feature analysis may be stopped in connection with certain example embodiments.

As alluded to above, a user may continue to drill down to subsequent levels of analysis. However, when a threshold number of the scores generated for the factor analysis features become less than the threshold value 710, the user may be automatically prompted and/or further drill-downs may be prevented, e.g., so that the user is guided to stop the navigation and select the final feature to display the list or have the list automatically displayed (e.g., displaying the FIG. 10 example). This is shown schematically in FIG. 11, which is similar to FIG. 7 and schematically shows how feature analysis may be stopped in connection with certain example embodiments. The input feature set 702' is run through the factor analysis component 1304 after feature 3 is selected, and the output feature set 706' is generated to include scored features. However, only feature 5 meets or exceeds the threshold value 710 and thus the listed features 708' includes only feature 5. The user may be presented with a popup box indicating that the exploration is likely complete, automatically taken directly to the output of FIG. 10 for instance, prevented from further drill-downs, and/or the like, in different example embodiments.

For instance, when a majority of features returned no longer have scores that meet the threshold value 710, when a predetermined number of features no longer have scores that meet the threshold value 710 (e.g., there is only feature with a sufficiently high score, there are fewer than 2, 5, 10, etc., of features, etc.), then the list may be displayed. This determination is made in step S1226 and the output generated in step S1230 in FIG. 12, and this is shown in greater detail in step S1327 with the output being presented in step S1329 in FIG. 13. If there is no automatic prompting to stop, the looping may continue where the dataset is filtered for the dependent features with the indicated values (step S1228 in FIG. 12) and where the features that previously were eliminated from consideration are once again considered (see step S1229 in FIG. 12).

In view of the foregoing, it will be appreciated that certain example embodiments may leverage feature selection factor analysis and variance analysis to provide a user with actionable insights from a dataset with many features. Advantageously, the user need not have specific knowledge of the domain, statistics, data interpretation, etc., as machine learning techniques can be leveraged to reveal actionable insights on large and complex datasets within minutes. In this regard, the variance analysis and feature selection factor analysis techniques of certain example embodiments can provided automated and programmatic ways of analyzing large and complex datasets where data (inter-)relationships are not necessarily known in advance, e.g., to help users of a variety of technical sophistications and with different amounts of domain experience to obtain actionable insights.

It will be appreciated that as used herein, the terms system, subsystem, service, engine, module, programmed logic circuitry, and the like may be implemented as any suitable combination of software, hardware, firmware, and/or the like. It also will be appreciated that the storage locations, stores, and repositories discussed herein may be any suitable combination of disk drive devices, memory locations, solid state drives, CD-ROMs, DVDs, tape backups, storage area network (SAN) systems, and/or any other appropriate tangible non-transitory computer readable storage medium. Cloud and/or distributed storage (e.g., using file sharing means), for instance, also may be used in certain example embodiments. It also will be appreciated that the techniques described herein may be accomplished by having at least one processor execute instructions that may be tangibly stored on a non-transitory computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A data analysis system, comprising:
   an electronic interface over which a dataset is accessible; and
   processing resources including at least one processor and a memory coupled thereto, the processing resources being configured to execute instructions stored to the memory to at least:
   access the dataset using the electronic interface;
   identify features within the dataset, wherein different features describe different properties of or pertaining to one or more data elements in the dataset;
   identify potential features of interest from the identified features;
   enable selection of one of the identified potential features of interest; and
   responsive to a selection of one of the identified potential features of interest:
   (a) select, based on a data type that is associated with the selected feature of interest, at least one of a plurality of algorithms and run the selected at least one of the plurality of algorithms on the dataset to identify at least one related feature that satisfies an influence threshold with respect to the selected feature of interest, wherein the at least one of the plurality of algorithms that are selected are variable across successive repetitions;
   (b) generate a display including a visual representation of each related feature, each visual representation including representations of data values associated with the respective related feature, wherein the representations of the data values form parts of the respective visual representations;
   (c) enable selection of one of the representations of the data values from one of the displayed visual representations;
   (d) responsive to a representation of a data value being selected in (c), filter rows from the dataset based on the selected representation of the data value and the respective related feature for the one of the representations of the data values that is selected; and
   repeat at least (a) (c), wherein the repetition is performed in connection with the filtered dataset, wherein the dataset filtration is maintained through successive repetitions, and wherein features not previously identified as being related in an earlier instance of (a) are identifiable in successive repetitions.

2. The system of claim 1, wherein the identification of the potential features of interest from the identified features includes, for each of the identified features, calculating the respective identified feature's variance.

3. The system of claim 2, wherein the identification of the potential features of interest from the identified features further includes normalizing the variances and designating a predetermined number of the identified features having the highest normalized variances as the potential features of interest.

4. The system of claim 2, wherein the identification of the potential features of interest from the identified features further includes designating a predetermined number of the identified features having the highest variances as the potential features of interest.

5. The system of claim 4, wherein the predetermined number is user-configurable.

6. The system of claim 1, wherein the generation of the display including the visual representation of each related feature includes:
   determining a chart type for each related feature; and
   forming each visual representation in accordance with the determined chart type for the respective related feature.

7. The system of claim 6, wherein the chart type for each related feature is determined automatically and is changeable in response to user input.

8. The system of claim 1, wherein the generation of the display including the visual representation for each related feature includes creating a bar chart for each related feature, and wherein the representations of data values are bars in the bar charts.

9. The system of claim 1, wherein the algorithms are run so as to identify, as a related feature, each related feature for which a corresponding visual representation was selected in a previous repetition.

10. The system of claim 1, wherein the display is generated to include a visual representation for each related feature for which a corresponding visual representation was selected in a previous repetition.

11. The system of claim 1, wherein the algorithms are run on a common set of the identified features across each repetition, regardless of whether any identified features have been identified as related features, and wherein different algorithms are runnable across successive repetitions.

12. The system of claim 1, wherein:
   the processing resources are further configured to execute instructions stored to the memory to at least determine which one of a plurality of classes of algorithms is to be run; and
   the algorithms that are selected to run for each iteration include algorithms included in the determined class.

13. The system of claim 12, wherein the determination of which one of the plurality of classes of algorithms is to be run is based on the data type of the selected feature of interest, wherein the class of algorithms to be run is variable across successive repetitions.

14. The system of claim 1, wherein the identification of the at least one related feature that satisfies the influence threshold includes:
   determining a predictive value of each algorithm run; and
   identifying, from the algorithm determined to have the highest predictive value, those features(s) that satisfy the influence threshold with respect to the selected feature of interest, as the at least one related feature.

15. The system of claim 1, wherein a plurality of related features is identified.

16. The system of claim 1, wherein the processing resources are further configured to respond to the number of features returned in (a) falling below a threshold by performing (b) and preventing (c) and (d).

17. The system of claim 1, wherein the processing resources are further configured to respond to the number of features returned in (a) falling below a threshold by performing (b) and preventing (c) and (d) in response to a majority of the features returned in (a) having a relevance-related score less than a predetermined value.

18. The system of claim 1, wherein (a) further comprises:
   determining a score for each feature; and
   selecting as the at least one related feature that satisfies the influence threshold; (i) all related features having an associated score above a predetermined threshold, (ii) the related features having the highest scores, up to N related features being selected, or (iii) the related features having the highest scores, up to M % related features being selected.

19. A method for analyzing data in a dataset, the method comprising:
   accessing the dataset using an electronic interface;
   identifying features within the dataset;
   identifying potential features of interest from the identified features;
   enabling selection of one of the identified potential features of interest; and
   responsive to a selection of one of the identified potential features of interest:
   (a) select, based on a data type that is associated with the selected feature of interest, at least one of a plurality of computer-implemented algorithms and run the selected at least one of the plurality of algorithms on the dataset to identify at least one related feature that satisfies an influence threshold with respect to the selected feature of interest, wherein the at least one of the plurality of algorithms that are selected are variable across successive repetitions;
   (b) causing a display to be generated, the display including a visual representation of each related feature, each visual representation including representations of data values associated with the respective related feature, wherein the representations of the data values form parts of the respective visual representations;
   (c) enabling selection of one of the representations of the data values from one of the displayed visual representations;
   (d) responsive to a representation of a data value being selected in (c), filter rows from the dataset based on the selected representation of the data value and the respective related feature for the one of the representations of the data values that is selected; and
   repeating at least (a)-(c), wherein the repetition is performed in connection with the filtered dataset, wherein the dataset filtration is maintained through successive repetitions, and wherein features not previously identified as being related in an earlier instance of (a) are identifiable in successive repetitions.

20. The method of claim 19, wherein the identification of the potential features of interest from the identified features includes:
   for each of the identified features, calculating the respective identified feature's variance; and
   designating a predetermined number of the identified features having the highest normalized or non-normalized variances as the potential features of interest.

21. The method of claim 19, further comprising:
   determining a chart type for each related feature; and
   forming each visual representation in accordance with the determined chart type for the respective related feature;
   wherein the chart type for each related feature is determined automatically and is changeable in response to user input.

22. The method of claim 19, wherein the algorithms are run on a common set of the identified features across each repetition, regardless of whether any identified features have been identified as related features.

23. The method of claim 19, further comprising determining which one of a plurality of classes of algorithms is to be run;
   wherein the algorithms that are selected to run for each iteration include algorithms included in the determined class.

24. The method of claim 19, wherein the identification of the at least one related feature that satisfies the influence threshold includes:
   determining a predictive value of each algorithm run; and
   identifying, from the algorithm determined to have the highest predictive value, the feature(s) that satisfy the influence threshold with respect to the selected feature of interest, as the at least one related feature.

25. The method of claim 19, further comprising, in response to the number of features returned in (a) falling below a threshold, (i) generating a user prompt, and (ii) performing (b) and preventing (c) and (d).

26. The method of claim 25, wherein (i) and (ii) are performed in response to a majority of the features returned in (a) having a relevance-related score less than a predetermined value.

27. A non-transitory computer readable storage medium storing instructions that, when executed by a computer including at least one hardware processor, control the computer to at least:
   access an electronic dataset;
   identify features within the dataset, wherein different features describe different properties of or pertaining to one or more data elements in the dataset;
   identify potential features of interest from the identified features;
   enable selection of one of the identified potential features of interest; and
   responsive to a selection of one of the identified potential features of interest:
   (a) select, based on a data type that is associated with the selected feature of interest, at least one of a plurality of computer-implemented algorithms and run the selected at least one of the plurality of algorithms on the dataset to identify a plurality of related features that satisfies an influence threshold with respect to the selected feature of interest, wherein the at least one of the plurality of algorithms that are selected are variable across successive repetitions;

(b) cause a display to be generated, the display including a visual representation of each related feature, each visual representation including representations of data values associated with the respective related feature, wherein the representations of the data values form parts of the respective visual representations;

(c) enable selection of one of the representations of the data values from one of the displayed visual representations;

(d) responsive to a representation of a data value being selected in (c), filter rows from the dataset based on the selected representation of the data value and the respective related feature for the one of the representations of the data values that is selected; and repeat at least (a)-(c), wherein the repetition is performed in connection with the filtered dataset, wherein the algorithms are run on a common set of the identified features across each repetition, regardless of whether any identified features have been identified as related features, and in response to the number of features returned in (a) falling below a threshold, perform (b) and preventing (c) and (d).

\* \* \* \* \*